(12) United States Patent
Van Gerrevink

(10) Patent No.: US 7,207,046 B1
(45) Date of Patent: Apr. 17, 2007

(54) METHOD AND SYSTEM FOR PROVIDING STRING-OVER-SOCKET SCRIPTING LANGUAGE ACCESS TO DISTRIBUTED OBJECT MODEL INTERFACES

(75) Inventor: Dean Van Gerrevink, Vancouver (CA)

(73) Assignee: Agilent Technologies, Inc., Santa Clara, CA (US)

( * ) Notice: Subject to any disclaimer, the term of this patent is extended or adjusted under 35 U.S.C. 154(b) by 648 days.

(21) Appl. No.: 09/645,048

(22) Filed: Aug. 23, 2000

(51) Int. Cl.
*G06F 13/00* (2006.01)

(52) U.S. Cl. .................. 719/313; 719/332; 709/230

(58) Field of Classification Search .......... 709/311, 709/328, 310, 315, 313, 330, 217, 219, 230, 709/237; 719/313, 316, 310, 315, 328, 330, 719/331, 332
See application file for complete search history.

(56) References Cited

U.S. PATENT DOCUMENTS

| | | | |
|---|---|---|---|
| 6,243,737 B1 * | 6/2001 | Flanagan et al. ........... 709/202 |
| 6,334,158 B1 * | 12/2001 | Jennyc et al. ............... 709/328 |
| 6,370,581 B2 * | 4/2002 | Rader ......................... 709/230 |
| 6,401,109 B1 * | 6/2002 | Heiney et al. ................ 709/1 |
| 6,427,161 B1 * | 7/2002 | LiVecchi .................... 718/102 |
| 6,457,066 B1 * | 9/2002 | Mein et al. .................. 719/330 |
| 6,496,871 B1 * | 12/2002 | Jagannathan et al. ....... 709/317 |
| 6,523,172 B1 * | 2/2003 | Martinez-Guerra et al. . 717/143 |
| 6,546,553 B1 * | 4/2003 | Hunt .......................... 717/174 |
| 6,668,279 B1 * | 12/2003 | Curtis ........................ 709/218 |
| 6,680,730 B1 * | 1/2004 | Shields et al. .............. 345/169 |
| 6,708,223 B1 * | 3/2004 | Wang et al. ................ 719/315 |
| 6,721,942 B1 * | 4/2004 | Sievert ....................... 717/137 |
| 6,983,463 B1 * | 1/2006 | Hunt .......................... 719/316 |

* cited by examiner

*Primary Examiner*—William Thomson
*Assistant Examiner*—Andy Ho

(57) ABSTRACT

A method and system for providing access for a scripting language on a first platform to objects on a second platform. First, a socket connection is established between a program written in a target scripting language and the second platform. Second, a string message that identifies a specific interface is transmitted across the socket. Third, the string message is automatically converted into a call on the specified object. Fourth, a status and any output parameters are converted into a string message and returned to the scripting language on the first platform.

20 Claims, 4 Drawing Sheets

METHOD AND SYSTEM FOR PROVIDING STRING-OVER-SOCKET SCRIPTING LANGUAGE ACCESS TO DISTRIBUTED OBJECT MODEL INTERFACES

FIELD OF THE INVENTION

The present invention relates to distributed object model technology, and more specifically, to a method and system for providing string-over-socket scripting language access to distributed object model interfaces.

BACKGROUND OF THE INVENTION

There is a large community of Tcl developers who provide packages of Tcl commands to the programming community. Tcl stands for "Tool Command Language" that has two main components: 1) a scripting language, and 2) an interpreter. Although similar to other UNIX shell languages, Tcl distinguishes itself from other shell languages in that it is easy to add or embed the Tcl interpreter into an application. The Tcl can then be utilized to configure and execute other programs and to customize the programs. For example, Tcl allows a programmer to structure an application as a set of primitives that can be composed with a script to best suit the needs of a user. Tcl also allows other programs to have program control over other applications.

Two examples of these packages are ActiveTcl and Tcom. ActiveTcl is a COM wrapper for the Tcl shell and provides access to Tcl from COM clients. Tcom provides access to COM interfaces from Tcl. Unfortunately, Tcom only works on Windows based hosts. Similar packages exist for Perl (e.g., ActivePerl), but these packages are also only available on Windows hosts. In addition, the client and server must both exist on the same Windows host.

COM interfaces can be accessed natively from scripting languages such as VBScript and JavaScript, but only when executing on a Windows personal computer. Alternative programming APIs extend the client Tcl interpreter with proprietary code and requires custom binaries to be shipped for each target platform. In addition, development is required for each target platform.

Customers and users of testing equipment may have a large installed base of UNIX based workstations. These customers have a significant investment in test equipment, existing software testing tools, and test configurations. These testing tools are often developed by the clients in a language such as Tcl or Perl and run on UNIX workstations. The assignee of the present invention has developed a Windows based tester. Consequently, it is important that there be a mechanism to allow these existing tools and test configurations to access the Windows based tester. Unfortunately, these existing tools and test configurations currently cannot communicate with a test system having a COM interface.

The re-development of these existing tools and test configurations, as can be appreciated, is expensive, time-consuming, and very inefficient.

Consequently, it is desirable to have a mechanism for allowing a scripting language (e.g., Tcl or Perl) in a first platform (e.g., UNIX) to access interfaces of a distributed object model that is specific to a second platform (e.g., a Windows platform).

SUMMARY OF THE INVENTION

The present invention provides access for a program written in a target scripting language (e.g., Tcl or Perl) running on a first platform (e.g., Windows, Unix, Apple, Linux, etc.) to a distributed object model interface running on a second platform (e.g., a COM object running on a Windows platform). The present invention utilizes a socket for transmitting information between the scripting language and the distributed object model interface. The information or message is preferably communicated by using a string protocol.

According to one aspect of the present invention, an access program for automatically mapping scripting language messages to a call on a COM interface without interface specific code is provided. Consequently, the present invention enables the efficient introduction of new interfaces to the system that become immediately available to the scripting language without the provision of interface specific code to the client since the mapping is generic.

Any target scripting language can be utilized provided that the scripting language can open sockets and send string messages. For example, scripting languages, such as Tcl and Perl, provide socket support and can be used to develop clients that can access COM objects through the access mechanism of the present invention.

According to one embodiment of the present invention, a method and system for providing access for a scripting language on a first platform to objects on a second platform are provided. First, a socket connection is established between the scripting language and the second platform. Second, a string message that identifies a specific interface is transmitted across the socket. Third, the string message is automatically converted into a call on the specified object. Fourth, a status and any output parameters are converted into a string message and returned to the scripting language on the first platform.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

A method and system for providing string-over-socket access from a scripting language on a first platform to objects (e.g., COM objects) developed on a second platform (e.g., a Windows platform) are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The process of providing string-over-socket scripting language access to COM objects shall now be described in greater detail.

Exemplary System

Figure 1:
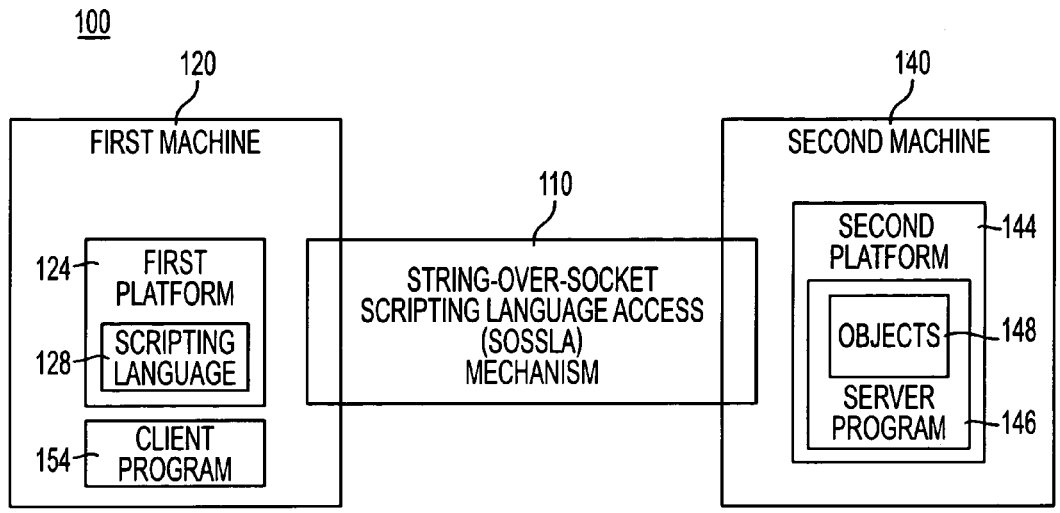
FIG. 1 is a block diagram of an exemplary system in which the string-over-socket scripting language access method and system of the present invention can be implemented.

FIG. 1 is a block diagram of an exemplary system 100 in which the string-over-socket scripting language access (SOSSLA) method and system 110 of the present invention can be implemented. The system 100 includes a first machine 120 (e.g., a personal computer) and a second machine 140 that can be remote from the first machine 120.

The first machine 120 includes a first platform 124 (hereinafter also referred to as a "target platform"). The first platform 124 includes at least one scripting language 128 (hereinafter also referred to as a "target scripting language") that can be used to develop a client program 154.

The second machine 140 (e.g., a host machine) includes a second platform 144 that includes a server program 146 that has a plurality of objects 148 (e.g., COM objects). The client 154 may from time to time require access to the objects 148 residing on the second machine 140.

An access mechanism 110 of the present invention provides for the client 154 residing on the first platform 124 access to the objects 148 residing on the second platform 144. As described in greater detail hereinafter with reference to FIGS. 3 and 4, the access mechanism 110 can be implemented as a server program in a client-server system.

Overview of Access Mechanism

The access technique employed by the present invention shall be explained with reference to a client program written in a Tcl scripting language using the present invention to access COM objects on the second machine 140. However, there are other target scripting languages and programming languages that are deemed equivalent to the Tcl scripting languages. In addition, there are other distributed object technology or models (e.g., CORBA and JAVA RMI) that are equivalent to COM objects. Consequently, the techniques described herein apply to all programming languages, whether or not such languages are actually scripting languages. In addition, the techniques described herein apply to all forms of distributed objects whether or not the objects are COM objects.

The present invention utilizes a string message having one or more of the following inputs: (1) an interface name; (2) a method name; and (3) input parameters.

Figure 2:
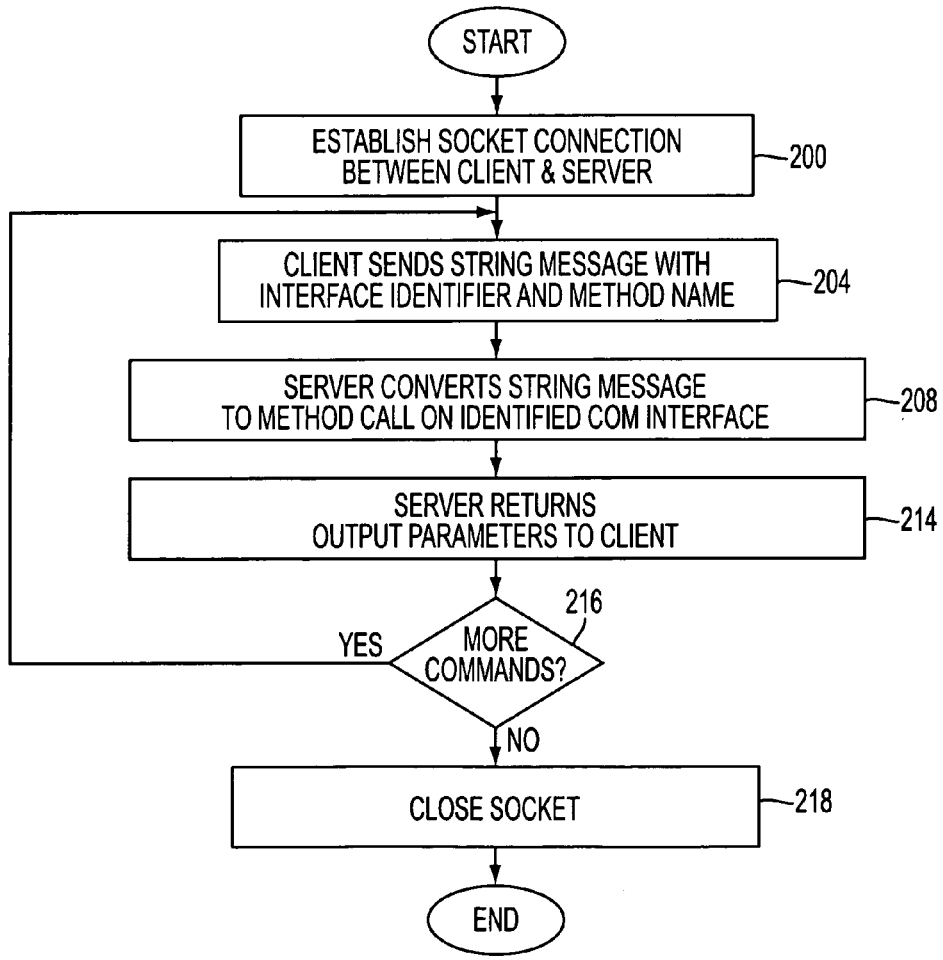
FIG. 2 is a flow chart illustrating the steps performed by the string-over-socket scripting language access method and system in accordance with one embodiment of the present invention.

FIG. 2 is a flow chart illustrating the steps performed by the string-over-socket scripting language access method and system in accordance with one embodiment of the present invention. In step 200, a socket connection is established between the client program 154 and the server program 146 by utilizing socket services provided by the scripting language 128 on the first platform 124. For example, a socket can be opened between the client program 154 and the server program 146.

In step 204, the client program 154 sends or transmits a string message that specifies a particular interface and one or more inputs to the server program 152 on the second platform 144. In step 208, the access program of the server 146 of the present invention automatically converts the string message into a method call on the specified object or interface. The conversion process can include the step of determining if the number of input parameters matches the number of expected input parameters and the step of converting each input parameter into a type required by the object. Preferably, a type library is queried to determine both the number and type of input parameters expected by the object.

If the number of input parameters does not match, an error message is generated to inform a user that the number of input parameters does not conform to the number required by the object. The input parameters can be converted into an appropriate type by using well-known conversion programming utilities that are described in greater detail hereinafter.

In step 214, the access program of the server 146 returns output parameters to the client program 154. The access program of the present invention receives a status and output parameters, if any, converts these into an output string message, and sends the output string message to the client program 154 over the socket connection.

In step 216, a determination is made whether there are more commands. If there are more commands, the processing continues at step 204, and steps 204 to 214 are repeated for the next command. If there are no more commands, processing continues at step 218. In step 218, the socket connection is closed.

Figure 3:
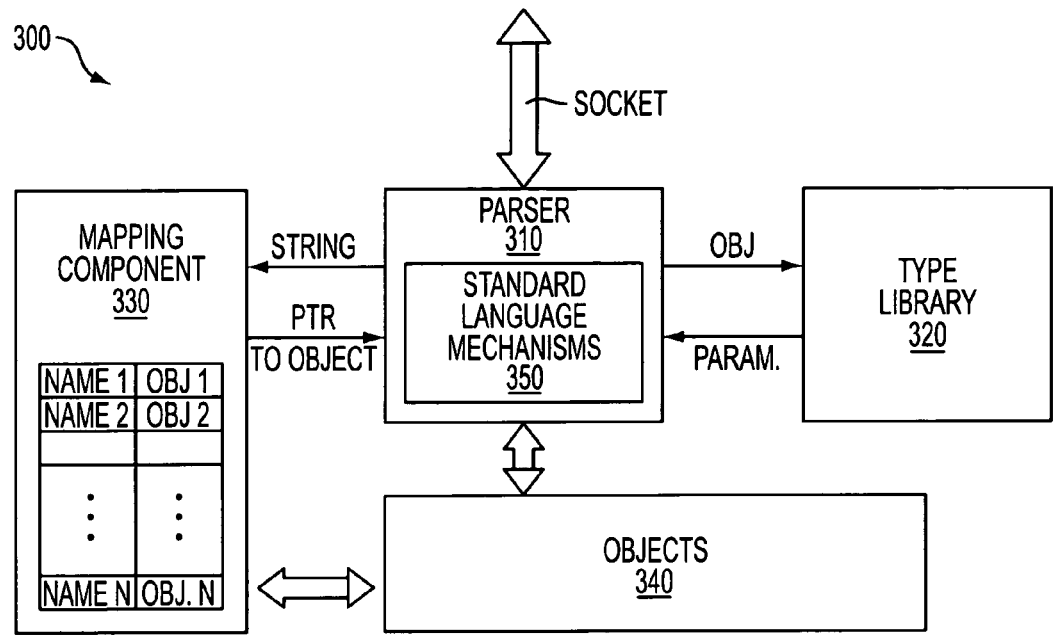
FIG. 3 is a block diagram of a server in a client-server implementation of the string-over-socket scripting language access method and system configured in accordance with one embodiment of the present invention.

FIG. 3 is a block diagram of a server 300 in a client-server implementation of the string-over-socket scripting language access method and system configured in accordance with one embodiment of the present invention. The server 300 includes a parser 310, a type library 320, a mapping component 330, and one or more objects 340. The parser 310 receives the string message, decodes the interface name, and provides the interface name to the mapping component 330. The mapping component 330 receives the interface name and returns a pointer to an object to which that interface belongs. The mapping component 330 can include a table for associating a first column of interface names and a second column of related objects. The parser 310 provides the pointer to the object to the type library 320, which in turn provides the expected number of input parameters and the expected parameter type for all methods of the requested object. The parser 310 also has access to standard language mechanisms 350 (e.g., C/C++ conversion utilities) for converting between string and other types.

The parser 310 checks to determine if the number of input parameters matches with the number of expected input parameters. If there is a match, the parser 310 calls various utilities that are well known to those of ordinary skill in the art to convert each input parameter to the expected parameter type, and dynamically build a call to the requested method with the converted input parameters. Additional aspects of server side design are described in greater detail hereinafter.

Figure 4:
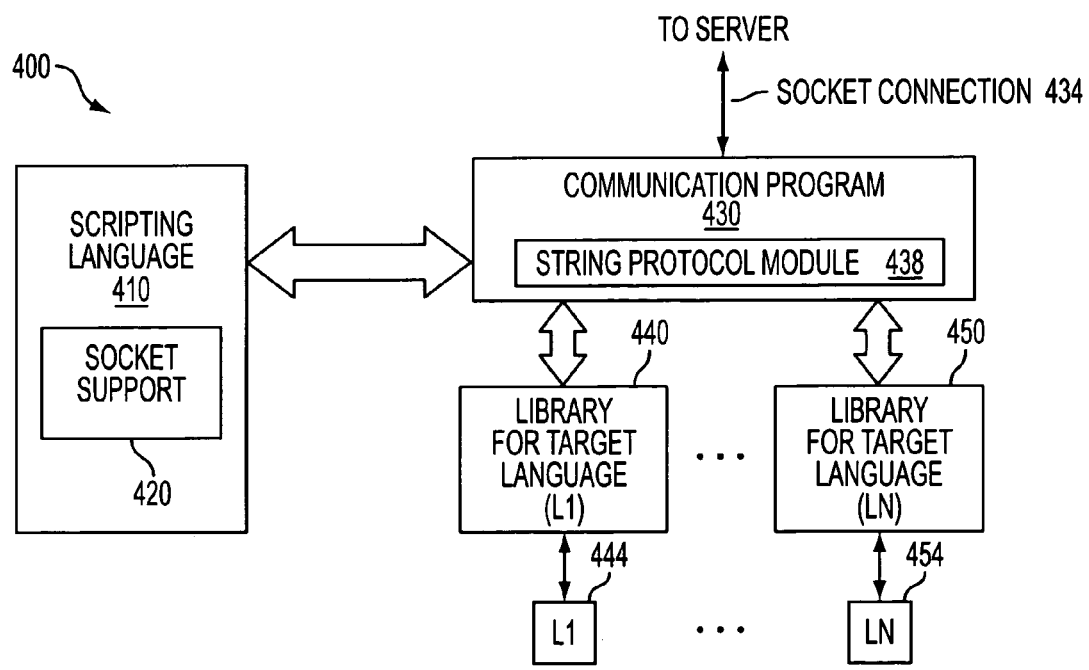
FIG. 4 is a block diagram of a client in a client-server implementation of the string-over-socket scripting language access method and system configured in accordance with one embodiment of the present invention.

FIG. 4 is a block diagram of a client 400 in a client-server implementation of the string-over-socket scripting language access method and system configured in accordance with one embodiment of the present invention. The target platform for the client 400 includes a scripting language 410 that includes socket support 420 for establishing a socket connection with the server 300. The client includes a communication program 430 for communicating with the server 300 via a socket connection 434. The communication program 430 has a string protocol module 438 for sending string messages to the server and implementing a string protocol that is described in greater detail hereinafter.

The communication program 430 is coupled to a plurality of languages (e.g., L1 and Ln) through a library (e.g., 440 and 450) specific for and associated with the particular language. The libraries can each provide wrapper functions to a corresponding target language in order to simplify the code required to access the socket. For example, the Tcl scripting language has such a library. Additional aspects of client side design are described in greater detail hereinafter.

Figure 5:
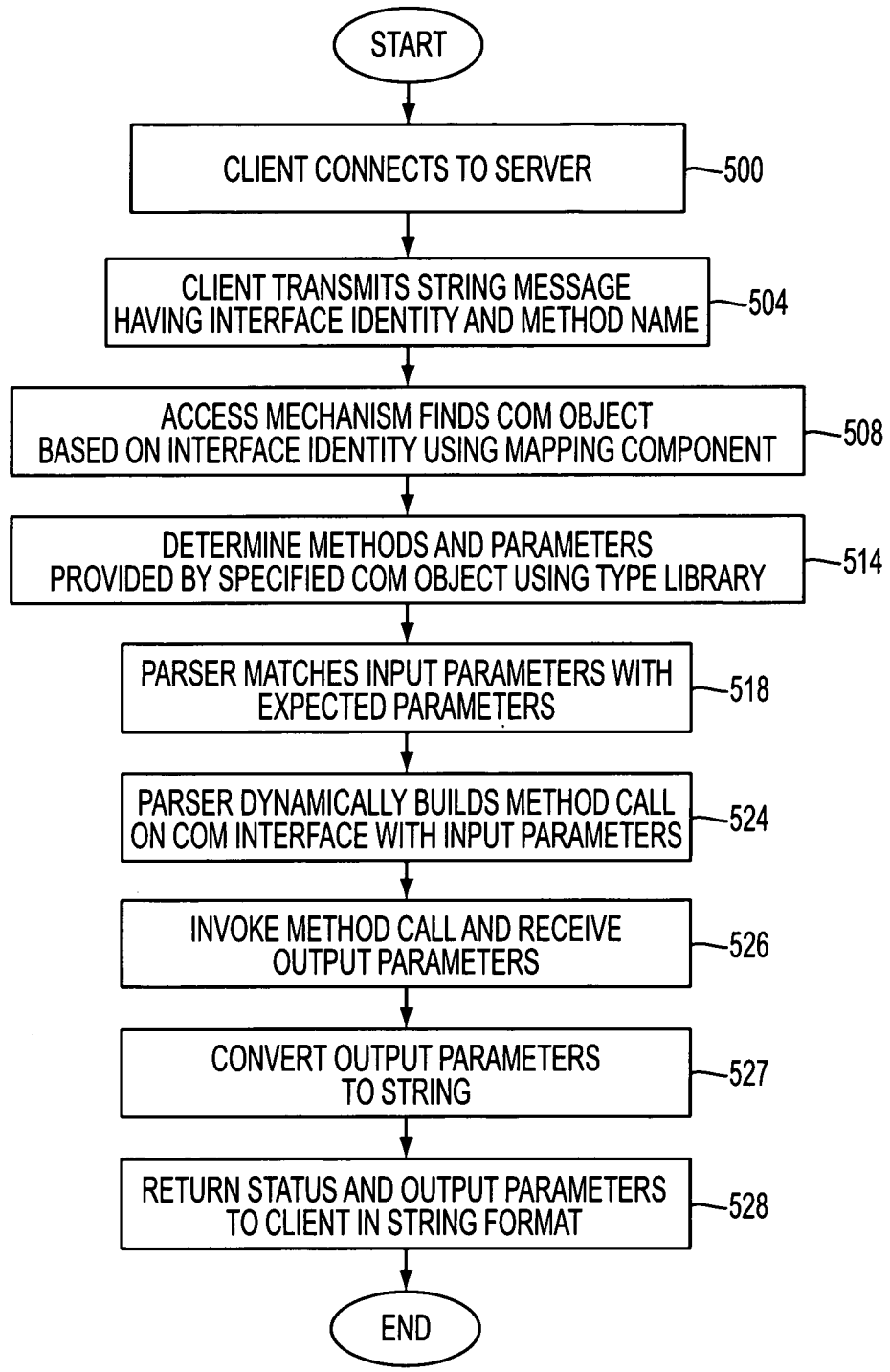
FIG. 5 is a flow chart illustrating in greater detail the steps of FIG. 2 in accordance with one embodiment of the present invention.

FIG. 5 is a flow chart illustrating in greater detail the steps of FIG. 2 in accordance with one embodiment of the present invention. In step 500, a client contacts the server. In step 504, the client transmits a string message having (1) an interface identity, (2) method, and (3) one or more input parameters over an open socket.

In step 508, an access mechanism finds a COM object based on the interface identity by using the mapping component 330. In step 514, the access mechanism determines the methods and parameters provided by an identified COM object. The methods and parameters provided by an identified COM object by utilizing the type library 320.

In step 518, the access mechanism matches input parameters received in step 504 with expected parameters. For example, the parser 310 can match the input parameters with expected parameters. If there is no match, an error message is generated to notify the user that the number of input parameters does not match the number of expected input parameters. If there is a match, then a type library is further consulted to determine the type of each parameter or argument. For example, if the expected type of a first argument is a string, then no conversion is needed. However, if the expected type of a first argument is an integer, for example, a string type to integer type conversion is performed on the first argument. For example, the "sscarf & atoi" utility can be utilized for this conversion in the "C" programming language. This conversion to the expected type is performed for each input parameter.

In step 524, the access mechanism dynamically builds a method call on the COM interface with the converted input parameters. For example, the parser 310 can dynamically build a method call on the COM interface with the converted input parameters. In step 526, the access mechanism invokes the method call and receives output parameters. In step 527, the access mechanism converts the output parameters into a string format.

In step 528, the access mechanism returns the status and the output parameters to the client in a string format over an open socket. The status and output parameters, which are described in greater detail hereinafter, are first converted to a string message by consulting an appropriate mapping in the type library. All output parameters are converted to a current type to a string type and then transmitted to the client over an open socket. Once again this type to string conversion can be accomplished using well known C/C++ utilizing functions, such as "sprintf".

Figure 6:
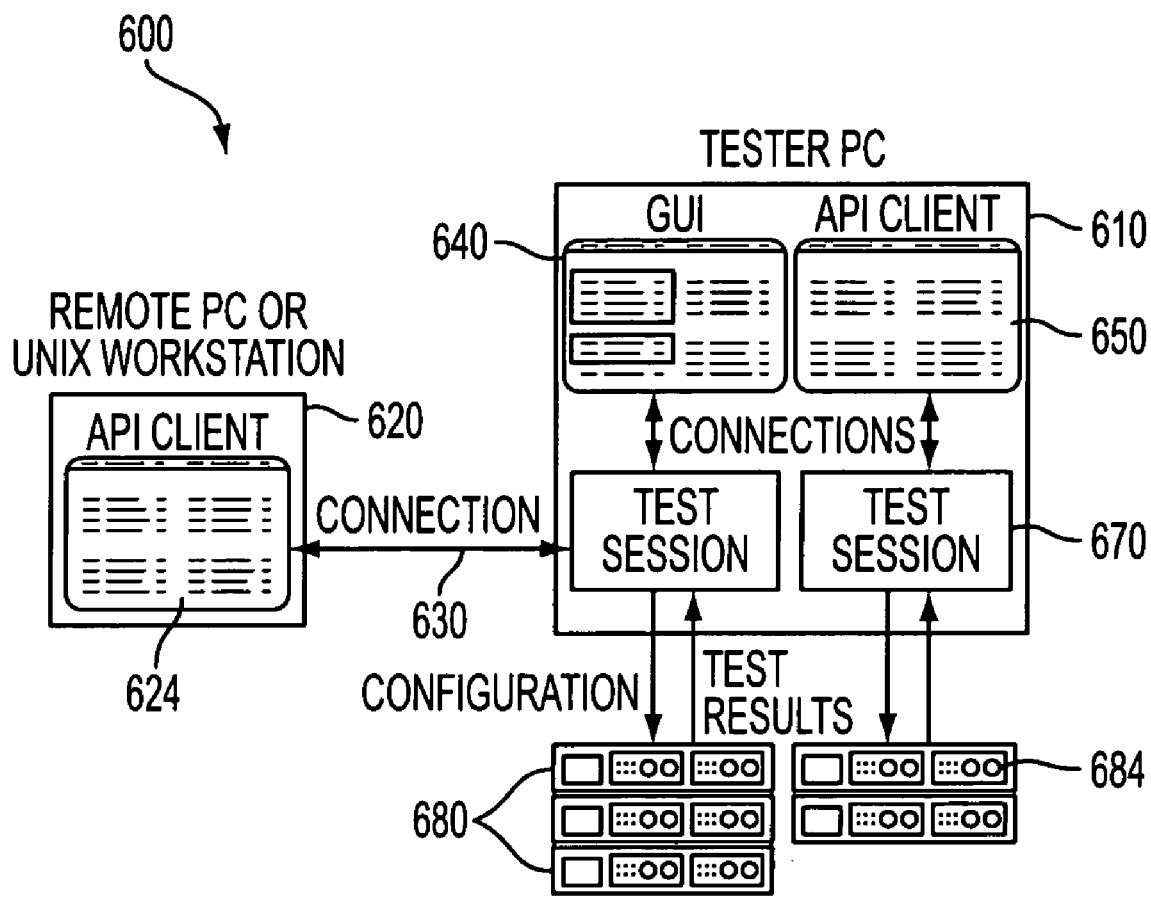
FIG. 6 illustrates a test system in which the string-over-socket scripting language access method and system of the present invention can be implemented.

FIG. 6 illustrates a test system 600 in which the string-over-socket scripting language access method and system of the present invention can be implemented. The test system 600 includes a tester personal computer (PC) 610, which can be a Windows-based host, coupled to a remote personal computer (PC) 620, which can be a UNIX workstation, through a connection 630. The connection 630 is preferably a general-purpose, line-oriented TCP socket connection through which string messages can be communicated.

The remote PC 620 includes a client 624 that requires access to COM objects that reside on the tester PC 610. The tester PC 610 can include a graphical user interface (GUI) module 640 for interfacing with a user, and can also include one or more clients 650 that also require access to COM objects. The clients 624 and 650 can be a scripting language shell (e.g., a Tcl shell) that sources commands from a script program (that can be written by a user) or processes commands that are entered through a standard user input.

The tester PC 610 can also include one or more test sessions 670 that can be run concurrently. Each test session is an instantiation of the tester software on the tester PC 610. The test session 670 reserves contiguous blocks of test modules 680 for its exclusive use. The test modules 680 include ports 684 for making real-time measurements and for passing results back to the test session. In addition, each test session 670 can be connected to multiple clients (e.g., 624 and 650) and the GUI module 640 and processes commands received therefrom.

One example of a distributed object model technology is Microsoft's Component Object Model (COM). COM is utilized to enable technologies such as object linking and embedding (OLE) that allows one Windows based application to be inserted into other Windows applications. For example, OLE allows an Excel spreadsheet to be inserted into a Microsoft Word document.

COM interfaces are written in a language called Interface Definition Language (IDL) The IDL definitions are then compiled to produce: (1) header files for use with C++; and (2) a binary description of the interface(s) that is referred to as "Type Library."

The Type Library can then be utilized by languages other than C++ to discover the details of the interfaces (e.g., method names, parameters, etc.). This information can then be used to construct method calls at run time. This scheme is used by languages, such as VisualBasic, Visual J++ (Java), VBScript and JavaScript. Unfortunately, the Type Library is not accessible to languages on platforms other than on Windows, and there is no mechanism in the prior art to provide this access. One aspect of the present invention is the provision of an access mechanism for accessing the Type Library of COM interfaces languages of non-Windows platforms.

An interface definition is IDL has the following form:
interface ICat
{
HRESULT Meow( );
}

Once the interfaces are compiled, and a type library installed on a system, clients can load the type library on demand, query for the method, and build a call stack dynamically. This process is referred to as automation or as dynamic invocation. As described in greater detail hereinafter, the present invention uses the dynamic invocation model.

Server Side Design

The server side design includes several key aspects: (1) a socket interface; (2) string protocol; and (3) a scripting parser.

Socket Interface

A socket can be a line-oriented TCP socket connection. Preferably, each message across the socket interface can have the following parameters. First, each message is on a single line that is terminated by a carriage return. Second, each message is a string that includes readable ASCII characters. Third, each message from the client to the server is provided to a scripting parser that preferably resides on the server and is described in greater detail hereinafter. The scripting parser replies with a status code (e.g., success or failure) and output parameters.

The present invention provides a general purpose string oriented socket interface for allowing clients writing in languages other than Tcl to access the server. For example, the general purpose string oriented socket interface of the present invention allows the server to provide access to a telnet session, scripts/programs written in any language on any platform that has socket support. These languages include, but are not limited to, Tcl, Perl, Java and C++, and the platforms include, but are not limited to, Windows, UNIX, Macintosh, etc. For example, clients can be written in the languages listed above and other languages on any platforms.

String Protocol

A message sent from the client to server is formed as follows:

invoke <Interface Name><Method Name><Input Parameters>

In response to this message, the server sends the following reply:

<Status><Output Parameters>

The Interface Name corresponds to a particular COM interface available to the client. The system maintains a list of {name, interface pointer} pairs. The COM interfaces provide methods that can be invoked. The Method Name corresponds to a method or property name on the particular COM interface. It is important for the input parameters to match the signature of the given method.

The status is an integer status code. For example, Zero(0) can be used to indicate success. A non-zero value indicates an error and a particular error code. In the case of error, the output parameters actually contains an error string, otherwise the output parameters matches the signature of the called method.

Client Side Design

On the client side, a scripting language that can work with sockets is needed. For example, an off-the-shelf implementation of a scripting language with socket abilities can be used. Preferably, a Tcl or Perl scripting language that has socket abilities is utilized on the client side. It is noted that the scripting language access mechanism of the present invention does not require compilation on the client side. Furthermore, the scripting language access mechanism of the present invention does not require custom binary executables or images for each target platform. Consequently, the scripting language access mechanism for a client-server system of the present invention simplifies software distribution and software support.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for a client program written in a first target language on a first platform of accessing objects of a server program on a second platform by using a string-over-socket protocol comprising:

a) the client program opening a socket connection to the server program;
b) the client program sending a string message with an interface identifier and method name to the server program; and
c) the server program converting the string message into a method call on the identified interface by utilizing dynamic invocation; and
d) the server program returning output parameters to the client program in a string message.

2. The method of claim 1 wherein the step of the server program converting the string message into a method call on the identified interface by utilizing dynamic invocation further comprises the steps of:

using a mapping component to find an object corresponding to the interface identity;
using a type library to determine the methods and parameters provided by the identified object;
matching the input parameters with the expected input parameters;
dynamically building a method call on the object with the input parameters; and
invoking the method call and receiving output parameters.

3. The method of claim 1 wherein the step of the client program sending a string message with an interface identifier and method name to the server program includes the step of the client program generating a string message that includes at least one of an interface name, a method name, and an input parameter; wherein the string message includes readable ASCII characters and a carriage return;
wherein the client program opening a socket connection to a server program includes the client program establishing a socket connection that is a line-oriented TCP socket connection.

4. A method for enabling a first program executing on a non-Windows-based platform to access at least one method of a Component Object Model (COM) interface provided by a second program that executes on a Window-based platform by using a string-over-socket protocol, the method comprising the steps of:

a) using an Interface Definition Language (IDL) to write at least one Component Object Model (COM) interface;
b) compiling the COM interface to generate a type library that includes a binary description of the COM interface;
c) installing the type library on the Windows-based platform; and
d) the first program on a non-Windows-based platform employing an invoke message configured in accordance with the string-over-socket protocol and dynamic invocation to access at least one method of the COM interface.

5. The method of claim 4 wherein the step of the first program on a non-Windows-based platform employing an invoke message configured in accordance with the string-over-socket protocol and dynamic invocation to access at least one method of the COM interface includes one of loading the type library for the COM interface, querying the COM interface for a method, dynamically building a method call, and invoking the method call.

6. The method of claim 4 wherein the first program is one of a testing tool and a test configuration written in a scripting language, wherein the second program is a tester software application.

7. The method of claim 4 wherein the first program is written in one of Tcl scripting language and Perl scripting language.

8. The method of claim 4 wherein the first platform is one of a UNIX platform, an Apple platform, a Linux platform, and a Windows platform.

9. The method of claim 4 wherein the second program provides one of CORBA objects, JAVA RMI objects, and distributed object model objects; wherein the second program includes a type library corresponding to one of the CORBA objects, the JAVA RMI objects, and the distributed object model objects; and wherein the first program on a non-Windows-based platform employs dynamic invocation to access at least one method of one of the CORBA objects, the JAVA RMI objects, and the distributed object model objects.

10. The method of claim 4 wherein the first program on a non-Windows-based platform employing an invoke message configured in accordance with the string-over-socket protocol and dynamic invocation to access at least one method of the COM interface includes the steps of establishing a socket connection between the first program on the non-Windows-based platform and the Windows-based platform; and transmitting a string message that identifies a specific interface over the socket connection
wherein the step of establishing a socket connection between the first program on the non-Windows-based platform and the Windows-based platform includes the step of
establishing a socket connection that is a line-oriented TCP socket connection; and
wherein the step of the transmitting a string message that identifies a specific interface over the socket connection includes
generating a string message that includes at least one of an interface name, a method name, and an input parameter, wherein the string message includes readable ASCII characters and is terminated by a carriage return.

11. A client-server computer system comprising:
a) a client program written in a first target language on a first platform; wherein the first target language supports socket connections; and
b) a server program on a second platform that has at least one object with an interface;
c) a type library corresponding to the interface of the object; wherein the type library includes a binary description of the interface of the object; and
d) an access program for providing access for the client program to the object on the second platform; wherein the client program and server program communicate by using a string-over-socket protocol.

12. The client-server computer system of claim 11 wherein the access program includes
a reception module for receiving messages over an open socket, wherein each message has an interface identifier for specifying an interface and at least one input parameter;
a match module coupled to the type library and the reception module for receiving the input parameter, determining the number of expected input parameters, determining the expected type for each input parameter; and comparing the number of expected input parameters to the actual number of received input parameters;
a type conversion module coupled to the match module for receiving the input parameters and converting each input parameter into an expected type;
a call builder for receiving the convened input parameters and for dynamically building a call to the specified interface of the object; and
an output parameter return module for receiving a status and output parameter, converting the status and output parameter to an output message and transmitting the message to the client program.

13. The client-server computer system of claim 11 wherein the first platform is a non-Windows based platform; wherein the client program is one of a testing tool and a test configuration written in a first target language; wherein the first target language is one of a Tcl scripting language and a Perl scripting language; wherein the server program is a tester software; and wherein the objects of the server program are distributed object model objects.

14. The client-server computer system of claim 13 wherein the distributed object model objects are one of Component Object Model (COM) objects, CORBA objects, and JAVA RMI objects.

15. The client-server computer system of claim 11 wherein the access program includes
a module for generating a string message that includes at least one of an interface name, a method name, and an input parameter; wherein the message further includes readable ASCII characters and a carriage return; and
a module for establishing a socket connection between the client pram and the server program that is a line-oriented TCP socket connection.

16. A method for providing access for a first program on a non-Windows platform to at least one interface of a distributed object model object on a Windows platform by using a string-over-socket protocol, the method comprising the steps of:
a) establishing a socket connection between the first program on the non-Windows platform and the Windows platform;
b) transmitting a message configured in accordance with string-over-socket protocol that identifies a specific interface through the socket connection; wherein the specific interface includes at least one method; and
c) employing dynamic invocation to access at least one method of the specific interface.

17. The method of claim 16 wherein employing dynamic invocation to access at least one method of the specific interface includes the steps of:
invoking at least one method provided by the specific interface by automatically converting the message into a method call on the specific interface; and
returning in a message configured in accordance with the string-over-socket protocol a status and any output parameters to the first program.

18. The method of claim 16 wherein the first program is one of a testing tool and a test configuration; wherein the distributed object model object is provided by a tester software program; wherein the first program is written one of Tcl scripting language, Perl scripting language, and other scripting language; and wherein the non-Windows platform is one of a UNIX platform, an Apple platform, and a Linux platform.

19. The method of claim 17 wherein the second platform includes a type library for providing a binary description of methods and parameters for the interface of the distributed object model object and wherein the step of invoking at least one method provided by the specific interface by automatically converting the message into a method call on the specific interface further comprises the steps of:

decoding input parameters from the string message;
using the type library to determine expected number of input parameters and the type of each input parameter;
determining if the decoded input parameters match the expected input parameters;
if yes, converting each input parameter into an expected type; and
generating a method call on the specific object by using the converted input parameters.

20. The method of claim 16 establishing a socket connection between the first program on the non-Windows platform and the Windows platform includes the step of establishing a socket connection that is a line-oriented TCP socket connection; and wherein the step of transmitting a message configured in accordance with string-over-socket protocol that identifies a specific interface through the socket connection includes the step of generating a message that includes at least one of an interface name, a method name, and an input parameter, wherein the message includes readable ASCII characters and a carriage return.

* * * * *

UNITED STATES PATENT AND TRADEMARK OFFICE
CERTIFICATE OF CORRECTION

PATENT NO. : 7,207,046 B1 Page 1 of 1
APPLICATION NO. : 09/645048
DATED : April 17, 2007
INVENTOR(S) : Van Gerrevink It is certified that error appears in the above-identified patent and that said Letters Patent is hereby corrected as shown below:

In column 8, line 66, in Claim 6, after "language" delete "," and insert -- ; --, therefor.

In column 10, line 1, in Claim 12, delete "convened" and insert -- converted --, therefor.

In column 10, line 27, in Claim 15, after "client" delete "pram" and insert -- program --, therefor.

In column 12, line 10, in Claim 20, after "parameter" delete "," and insert -- ; --, therefor.

Signed and Sealed this

Twenty-eighth Day of August, 2007

JON W. DUDAS
*Director of the United States Patent and Trademark Office*